United States Patent
Lin

(10) Patent No.: US 11,686,431 B1
(45) Date of Patent: Jun. 27, 2023

(54) SUPPORTING STRUCTURE WITH SUCKING UNIT

(71) Applicant: ALPHA NETWORKS INC., Hsinchu (TW)

(72) Inventor: Tzu-Chih Lin, Hsinchu (TW)

(73) Assignee: ALPHA NETWORKS INC, Hsinchu (TW)

( * ) Notice: Subject to any disclaimer, the term of this patent is extended or adjusted under 35 U.S.C. 154(b) by 0 days.

(21) Appl. No.: 17/747,561

(22) Filed: May 18, 2022

(30) Foreign Application Priority Data

Feb. 11, 2022 (TW) .................................. 111105032

(51) Int. Cl.
*F16M 13/02* (2006.01)
*F16M 11/04* (2006.01)
*F16M 11/22* (2006.01)
*F16M 11/10* (2006.01)

(52) U.S. Cl.
CPC ........ *F16M 13/022* (2013.01); *F16M 11/041* (2013.01); *F16M 11/10* (2013.01); *F16M 11/22* (2013.01)

(58) Field of Classification Search
CPC combination set(s) only.
See application file for complete search history.

(56) References Cited

U.S. PATENT DOCUMENTS

| 5,961,087 A * | 10/1999 | Lee ...................... F16M 13/022 248/205.8 |
| 7,226,026 B2 * | 6/2007 | Lin ......................... F16B 47/00 248/205.8 |
| 7,404,536 B2 * | 7/2008 | Kalb ....................... F16B 47/00 248/205.5 |
| 7,431,250 B2 * | 10/2008 | Chen ....................... F16B 47/00 248/205.5 |
| 7,850,133 B2 * | 12/2010 | Carnevali ............... F16B 47/00 248/205.8 |
| 8,681,492 B2 * | 3/2014 | Fan ......................... G06F 1/166 248/205.5 |
| 10,753,384 B1 * | 8/2020 | Chang ..................... F16B 47/00 |
| 11,019,910 B2 * | 6/2021 | Walton ................. F16M 11/105 |
| 11,585,371 B2 * | 2/2023 | Huang .................. F16M 13/022 |
| 2005/0157868 A1 * | 7/2005 | Wang ..................... B60R 11/02 379/455 |
| 2007/0120026 A1 * | 5/2007 | Chen ....................... F16B 47/00 248/205.5 |
| 2008/0217826 A1 * | 9/2008 | Kim .................... B60R 11/0258 269/21 |
| 2009/0294608 A1 * | 12/2009 | Brassard ................. F16B 47/00 248/205.5 |

(Continued)

*Primary Examiner* — Monica E Millner
(74) *Attorney, Agent, or Firm* — Birch, Stewart, Kolasch & Birch, LLP

(57) ABSTRACT

A supporting structure includes a seat, a suction cup, a rotary plate, and a support, wherein the suction cup is located at a cavity of the seat. The rotary plate is disposed between the seat and a bottom portion of the support. The support drives the suction cup to act together. By rotating the rotary plate clockwise or counter-clockwise, a distance between the bottom portion of the support and the seat could be changed to make the suction cup be attached to or removed from a smooth surface of an object. The supporting structure of the present invention facilitates the convenience of use.

10 Claims, 12 Drawing Sheets

(56) References Cited

U.S. PATENT DOCUMENTS

| | | | |
|---|---|---|---|
| 2012/0006952 A1* | 1/2012 | Tsai | F16B 47/00 248/206.3 |
| 2014/0054338 A1* | 2/2014 | Casagrande | B60R 11/02 248/205.5 |
| 2015/0369276 A1* | 12/2015 | Balmer | F16B 47/00 248/205.8 |
| 2016/0025264 A1* | 1/2016 | Casagrande | F16M 13/00 248/205.9 |
| 2020/0248738 A1* | 8/2020 | Chang | F16B 47/00 |
| 2021/0207647 A1* | 7/2021 | Liao | F16B 47/00 |
| 2022/0205586 A1* | 6/2022 | Zimmerman | F16M 13/022 |

\* cited by examiner

SUPPORTING STRUCTURE WITH SUCKING UNIT

BACKGROUND OF THE INVENTION

Technical Field

The present invention relates generally to a supporting structure that could suck to a smooth surface and for mounting an article, and more particularly to a supporting structure with a sucking unit.

Description of Related Art

Generally, a supporting frame for mounting an article (such as monitoring equipment) that could be adhered to a smooth surface of an object (such as a glass, a ceramic tile, or a smooth stone slab) includes a support and a suction cup, wherein the suction cup is disposed at an end of the support, and the article is connected to another end of the support. By pressing to deform the suction cup, the air in a space between a sucking surface of the suction cup and the smooth surface is forced to be exhausted, so that the suction cup is attached to the smooth surface.

However, after the supporting frame is connected to the article having a considerable weight, the suction cup is easy to depart from the smooth surface due to the sucking ability of the suction cup is weak leading to malfunction. The article is probably broken by hitting the ground. Besides, when the user mounts the support, the supporting frame is pressed toward the smooth surface to discharge the air between the suction cup and the smooth surface. However, when the object providing the smooth surface is a surface of the glass, the object (glass) is probably damaged. Additionally, during a process of heavily pressing, once a direction of force is tilted from an expected direction, the supporting frame probably slides or falls. Except the supporting frame needs to be aligned and mounted again, the user has a risk of injury. Thus, the conventional supporting frame with the suction cup has unreliable sucking ability, so there has room for improvement.

BRIEF SUMMARY OF THE INVENTION

In view of the above, the primary objective of the present invention is to provide a supporting structure with a sucking unit, which has a reliable sucking ability and is easy to use.

The present inventive subject matter provides a supporting structure including a seat, a sucking unit, a support, and a rotary plate. The seat has a bulged portion, a cavity, and a perforation, wherein the cavity of the seat is formed correspondingly to the bulged portion, and the perforation communicates with the cavity. The sucking unit includes a suction cup, a protruding column, and a check valve, wherein the suction cup is located in the cavity of the seat. The protruding column has a gas channel and a first end and a second end that are opposite. The first end of the protruding column is connected to a central portion of the suction cup, and the second end of the protruding column passes through the perforation of the seat. The check valve is disposed in the gas channel of the protruding column. The support has a top portion and a bottom portion, wherein the top portion of the support is adapted to be connected to an article. The bottom portion of the support is connected to the second end of the protruding column. The rotary plate is passed through by the protruding column and is located between the seat and the bottom portion, wherein the rotary plate is rotatable along the protruding column between a first position and a second position. When the rotary plate is located at the first position, the check valve is open to unblock the gas channel. When the rotary plate is located at the second position, the check valve is closed to block the gas channel.

With such design, by rotating the rotary plate in a clockwise direction or a counter-clockwise direction, the sucking unit could firmly adhere or be quickly removed. Thus, the supporting structure could be easily and quickly operated to attach or detach to the smooth surface.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
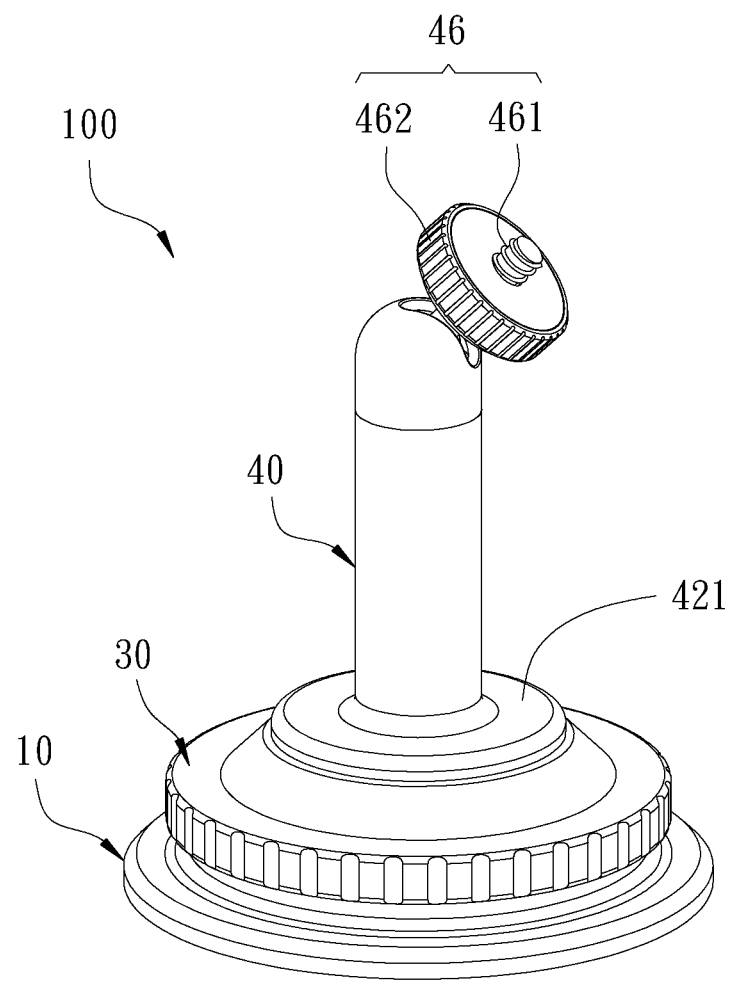
FIG. 1 is a perspective view of the supporting structure of an embodiment according to the present invention.
Figure 2:
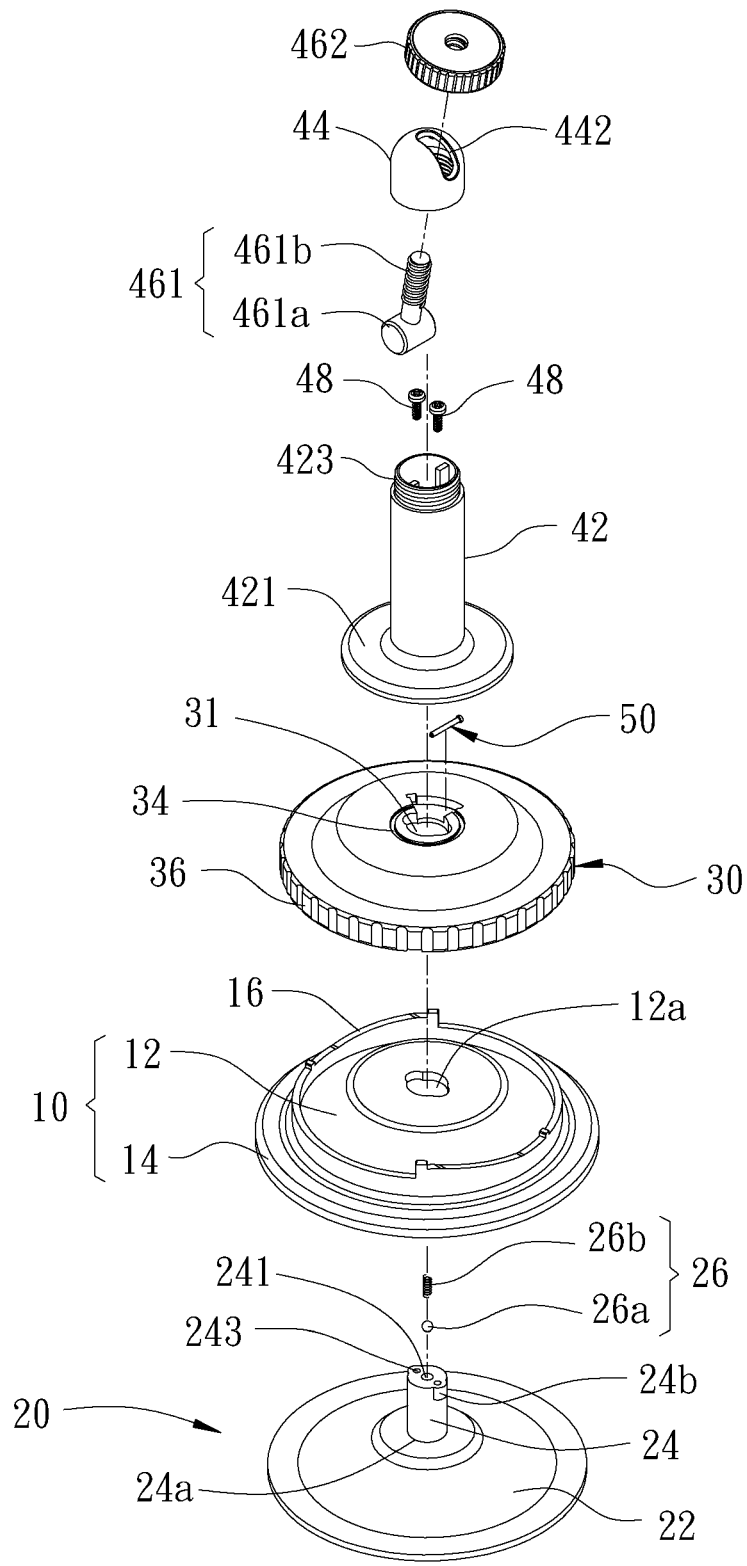
FIG. 2 is an exploded view of the supporting structure of the embodiment according to the present invention.
Figure 3:
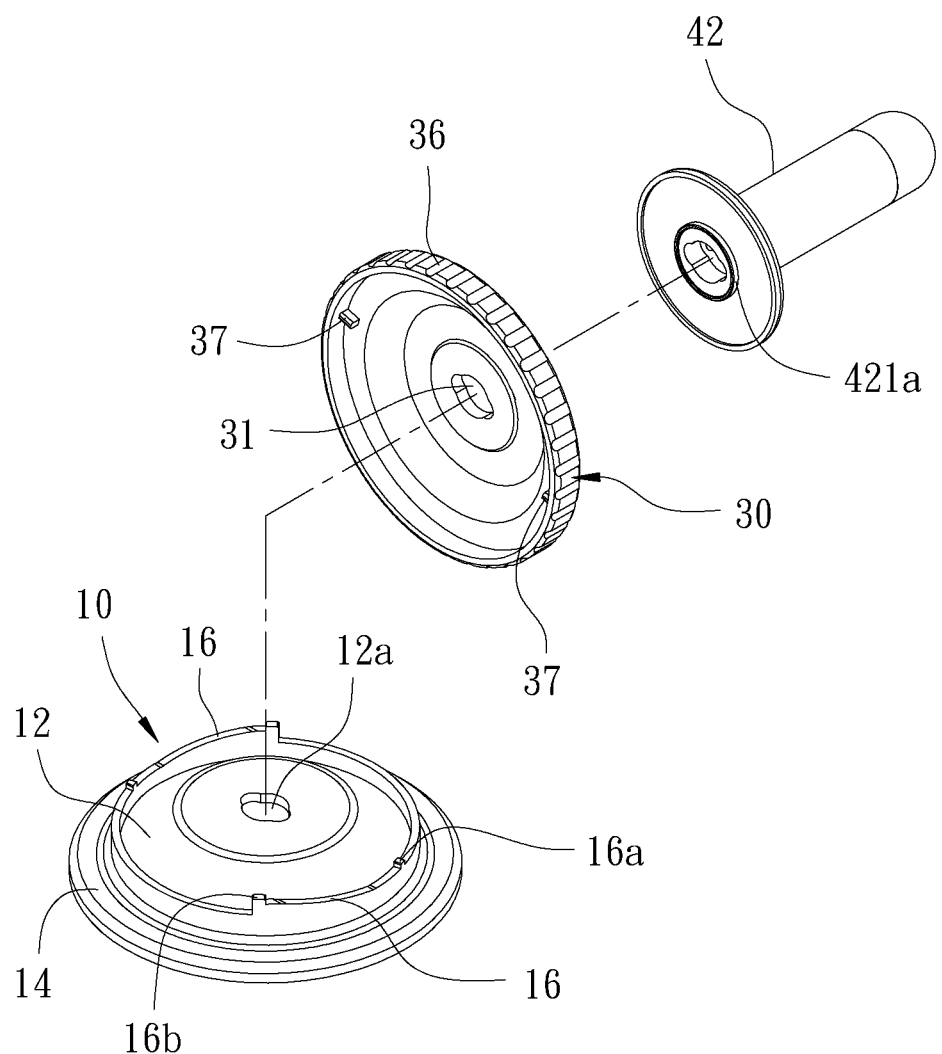
FIG. 3 is a partially exploded view of the supporting structure of the embodiment according to the present invention.
Figure 4:
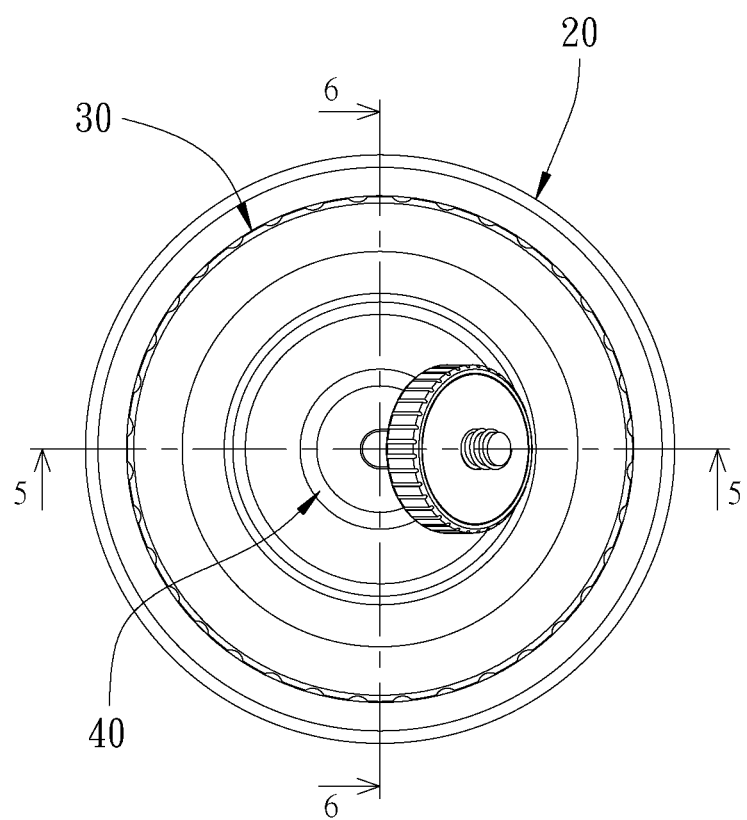
FIG. 4 is a top view of the supporting structure shown in FIG. 1.

As illustrated in FIG. 1 to FIG. 6, a supporting structure 100 includes a seat 10, a sucking unit 20, a rotary plate 30, and a support 40.

The seat 10 is a disc body that has a bulged portion 12 at the middle and a lip 14 extending outwardly, wherein the bulged portion 12 is surrounded by the lip 14. A cavity S1 is formed at a bottom side of the seat 10 corresponding to the bulged portion 12. A central portion of the bulged portion 12 has a perforation 12a. The perforation 12a communicates with the cavity S1. A flat surface 14a is formed on a bottom side of the lip 14 Additionally, at least one slanted surface 16 is formed by protruding upwardly from a portion of a top side of the bulged portion 12 of the seat 10 that is adjacent to the lip 14, wherein the at least one slanted surface 16 extends in a circumferential direction of the seat 10. The slanted surface 16 has a low level and a high level and is disposed with a lower block 16a at the low level and an upper block 16b at the high level. In the current embodiment, the seat 10 includes two slanted surfaces 16 that are disposed symmetrically.

Figure 5:
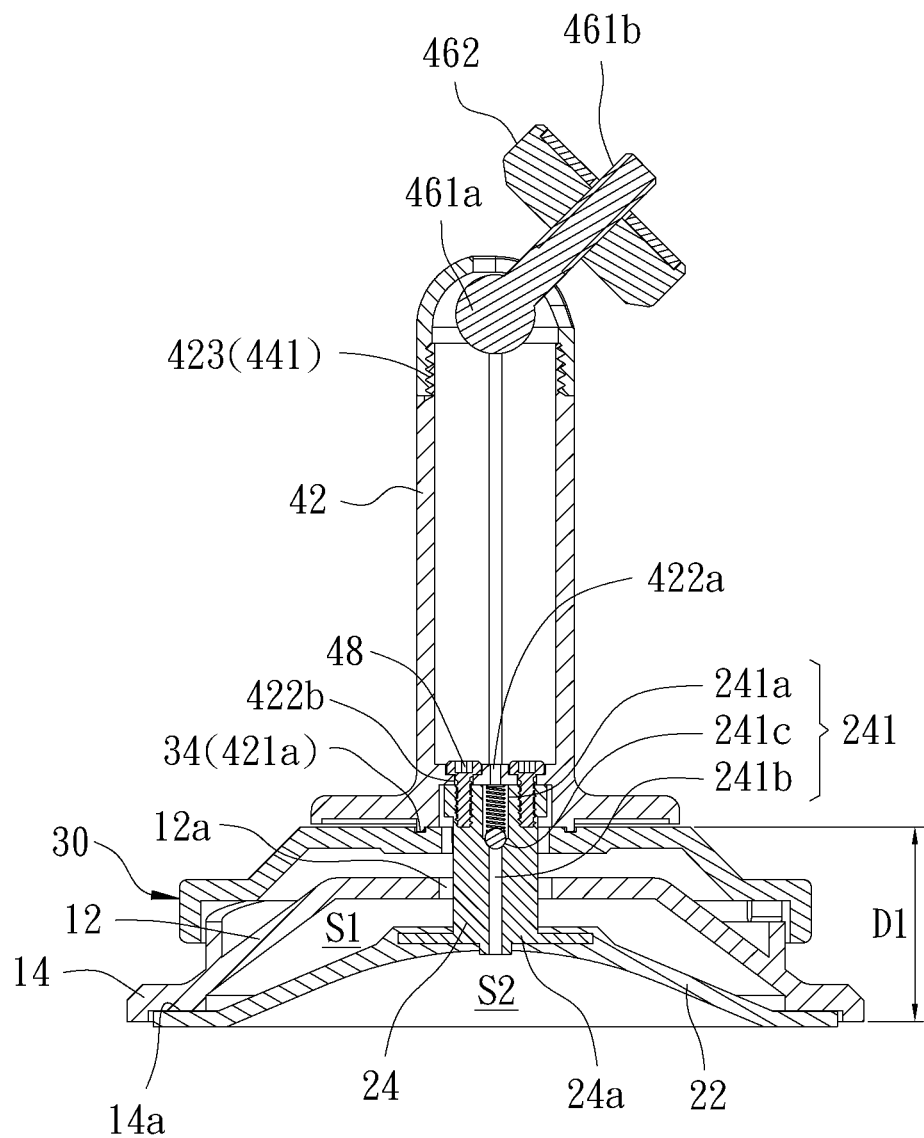
FIG. 5 is a section view taken along 5-5 line in FIG. 4.

The sucking unit 20 includes a suction cup 22, a protruding column 24, and a check valve 26, wherein the suction cup 22 is located in the cavity S1 of the seat 10, and a diameter of the suction cup 22 is slightly smaller than an outer diameter of the seat 10. As illustrated in FIG. 5, a portion of the suction cup 22 that is adjacent to an outer edge of the suction cup 22 abuts against the flat surface 14a of the lip 14. The protruding column 24 is a cylinder and has a first end 24a and a second end 24b which are opposite. The first end 24a of the protruding column 24 is connected to a central portion of the suction cup 22, and the second end 24b of the protruding column 24 passes through the perforation 12a of the seat 10. The protruding column 24 has a gas channel 241 and a hole 242, wherein the gas channel 241 passes through the protruding column 24 and extends in an axial direction, and the hole 242 extends in a radial direction of the protruding column 24 and communicates with the gas channel 241. In the current embodiment, the gas channel 241 includes a first section 241a and a second section 241b, wherein a diameter of the first section 241a is greater than a diameter of the second section 241b, so that a connection site between the first section 241a and the second section 241b forms a shoulder 241c. Additionally, the protruding column 24 has two screw holes 243 located around the gas channel 241, wherein an axial direction of each of the two screw holes 243 is parallel to an axial direction of the gas channel 241. The check valve 26 is disposed in the gas channel 241 of the protruding column 24. In the current embodiment, the check valve 26 includes a ball 26a and a spring 26b that are located in the first section 241a. The spring 26b urges against the ball 26a to block the gas channel 241. In the current embodiment, a diameter of the ball 26a is smaller than the diameter of the first section 241a and is greater than the diameter of the second section 241b.

Figure 7:
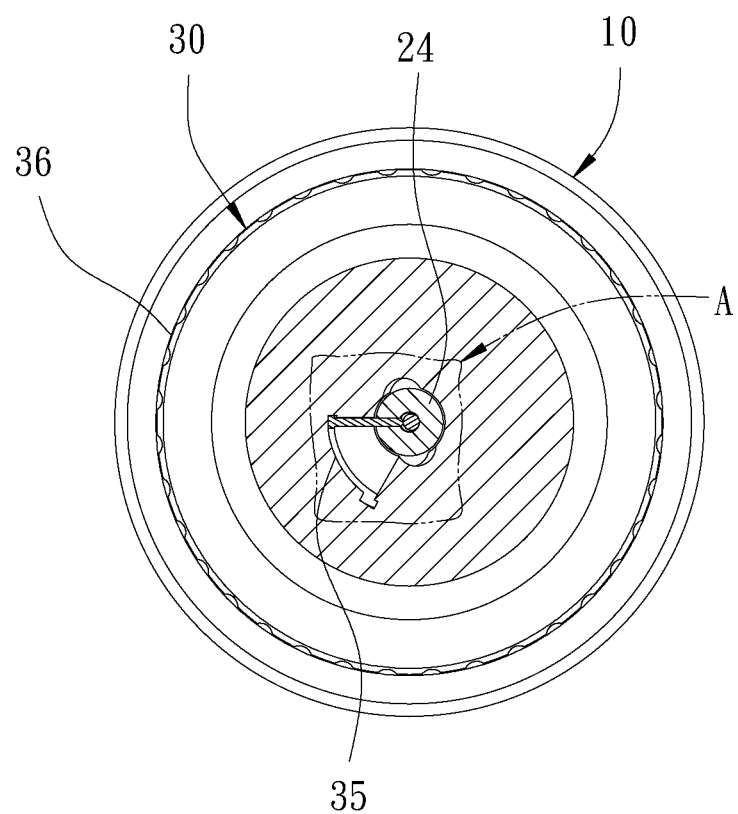
FIG. 7 is a section view taken along 7-7 line in FIG. 6.
Figure 8:
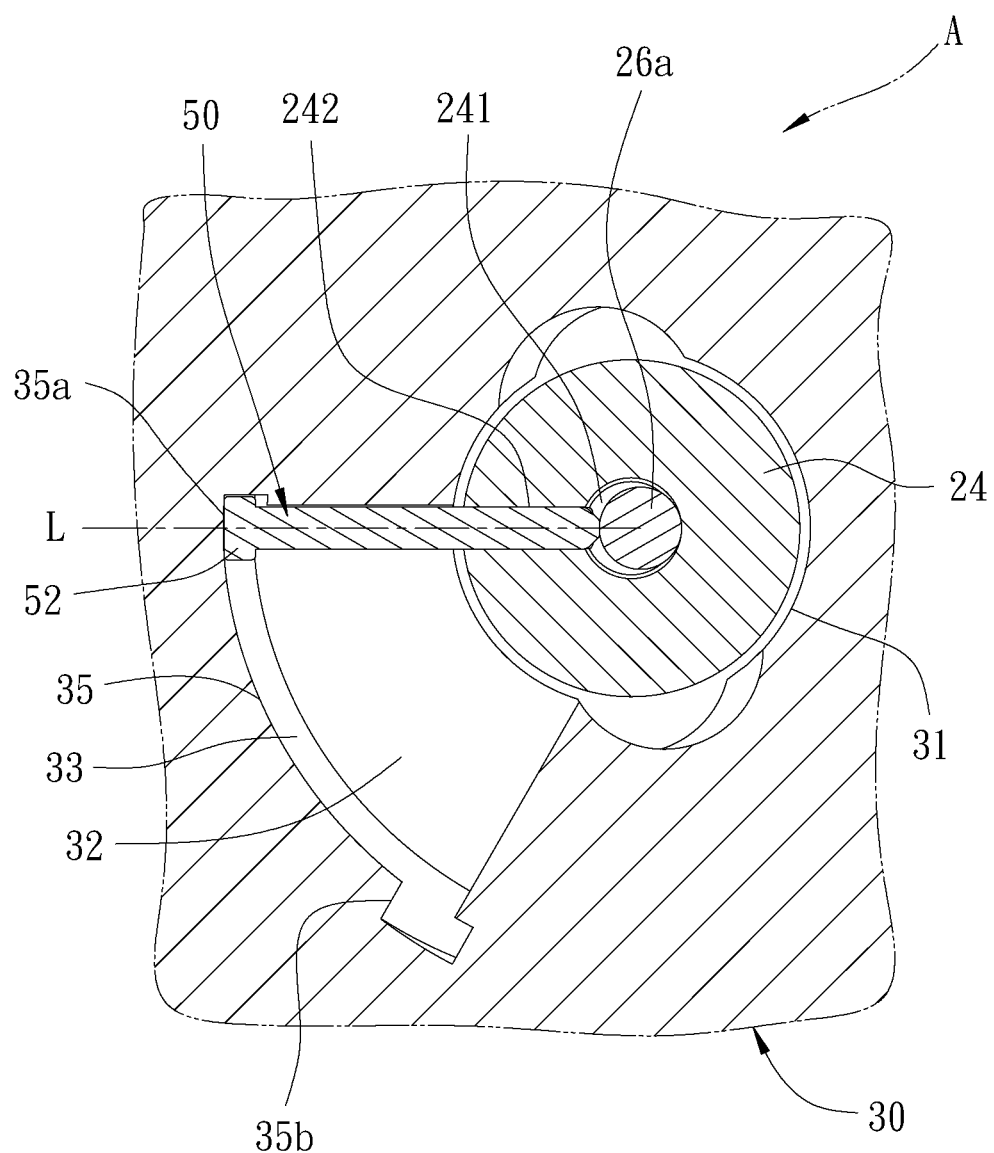
FIG. 8 is an enlarged partial view of a marked region A in FIG. 7.
Figure 9:
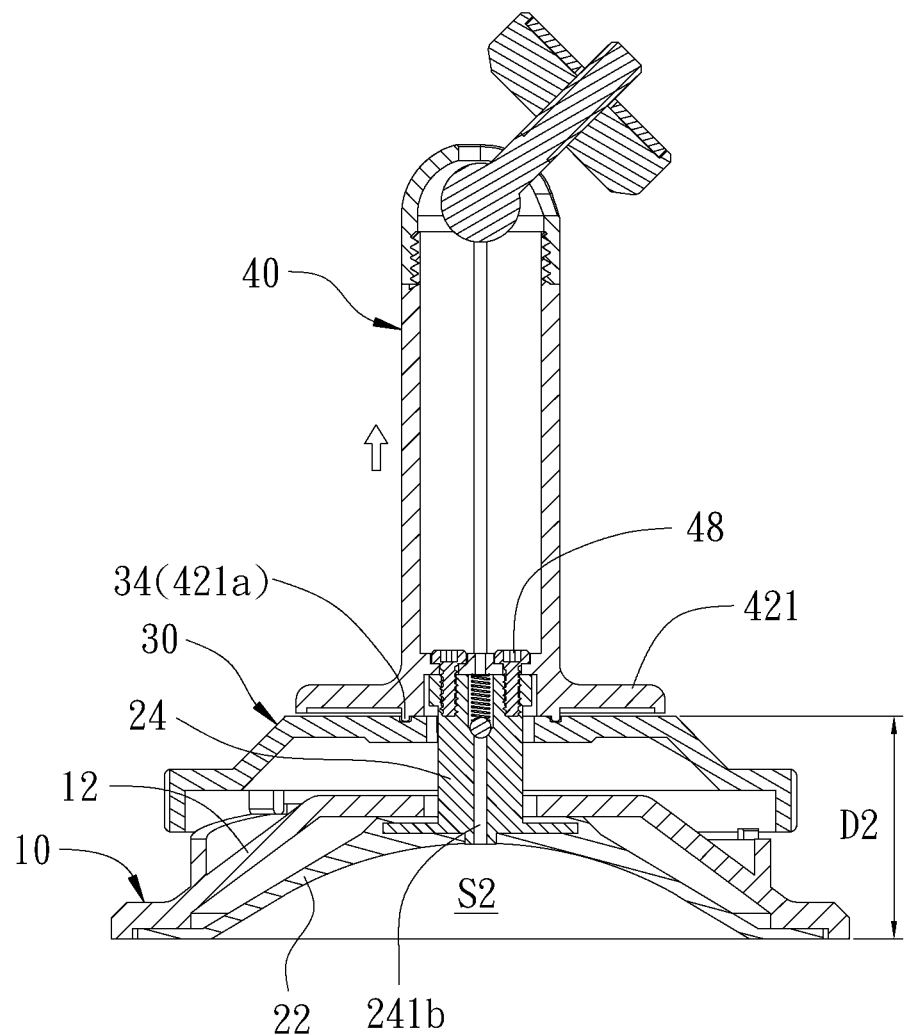
FIG. 9 is similar to FIG. 5, showing the suction cup of the supporting structure is deformed.

The rotary plate 30 has a perforation 31 at a central portion, wherein the perforation 31 is passed through by the protruding column 24. The rotary plate 30 is rotatable along the protruding column 24. As illustrated in FIG. 7 and FIG. 8, a top surface of the rotary plate 30 is recessed to form a sectorial recess 32, a curved groove 33, and an annular groove 34, wherein the sectorial recess 32 communicates with the perforation 31, and a side of the sectorial recess 32 has an arched surface 35. A curvature of the arched surface 35 is different than a curvature of the circumference 36 of the rotary plate 30. More specifically, the arched surface 35 has a first end 35a and a second end 35b, wherein a distance between the first end 35a of the arched surface 35 and a center of the protruding column 24 is smaller than a distance between the second end 35b of the arched surface 35 and the center of the protruding column 24. The curved groove 33 is disposed along the arched surface 35, and a curvature of the curved groove 33 is the same as the curvature of the arched surface 35. A radius of the annular groove 34 is constant, and the annular groove 34 surrounds the perforation 31. A depth of the sectorial recess 32 is smaller than a depth of the curved groove 33 and is greater than a depth of the annular groove 34. Additionally, a bottom surface of the rotary plate 30 has at least one pushing block 37, wherein the pushing block 37 is movable along the slanted surface 16 between the lower block 16a and the upper block 16b as the rotary plate 30 is rotated. In the current embodiment, the rotary plate 30 has two pushing blocks 37, and each of the two pushing blocks 37 is disposed at a position that could correspond to one of the two slanted surfaces 16.

Figure 6:
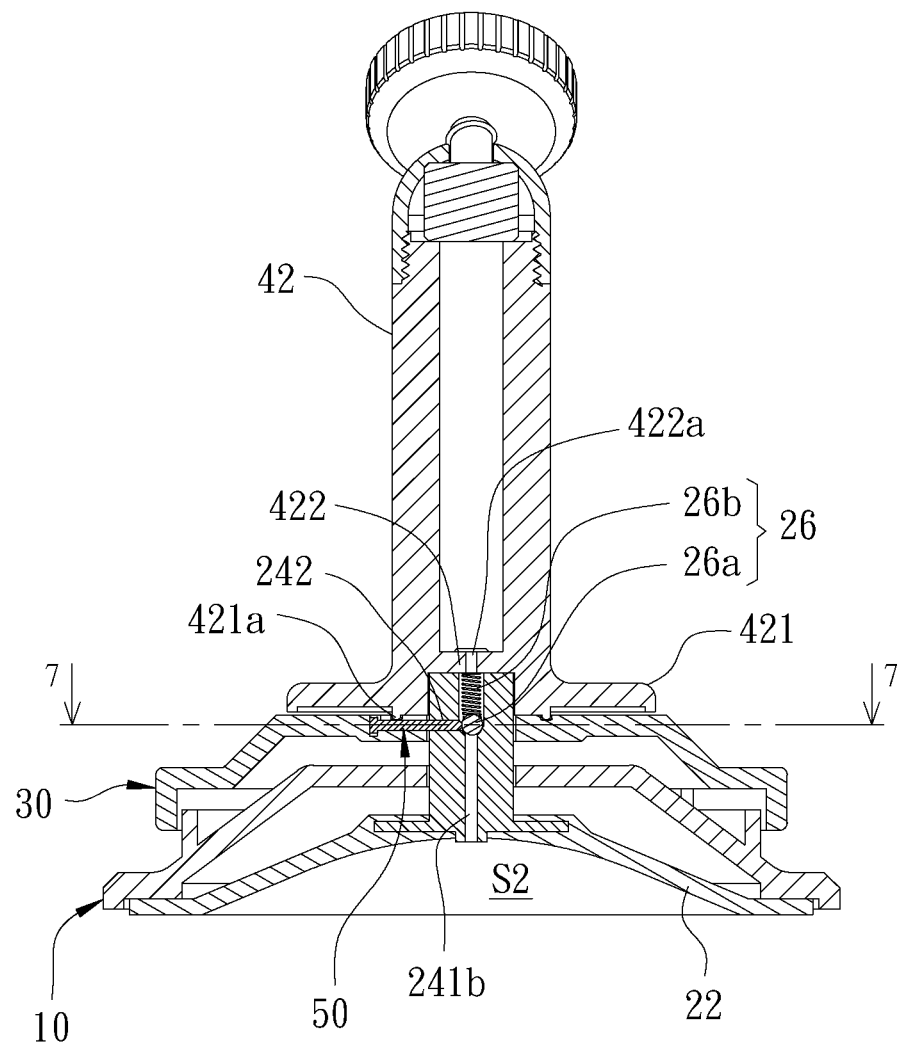
FIG. 6 is a section view taken along 6-6 line in FIG. 4.

The support 40 has a top portion and a bottom portion. The top portion of the support 40 is adapted to be connected to an article (not shown). The bottom portion of the support 40 is connected to the second end 24b of the protruding column 24. The article includes but, is not limited to, monitoring equipment. In the current embodiment, the support 40 includes a tube body 42, a top cap 44, and a connecting unit 46. A bottom portion of the tube body 42 extends outwardly in the radial direction to form an extending plate 421 and extends inwardly in the radial direction to form an inner plate 422, wherein the extending plate 421 and the inner plate 422 are integrally formed as a monolithic unit, as shown in FIG. 6. A bottom surface of the extending plate 421 of the support 40 has an annular projection 421a. The inner plate 422 has a vent 422a and two perforations 422b, which are located around the vent 422a, wherein an axial direction of each of the two perforations 422b of inner plate 422 is parallel to an axial direction of the vent 422a. A top portion of the tube body 42 includes an external threaded section 423, and the top cap 44 has an internal threaded section 441 that is threadedly connected to the external threaded section 423 of the tube body 42. The top cap 44 has an opening 442. The connecting unit 46 could be connected to the article. In the current embodiment, the connecting unit 46 is constituted of a connector 461 and a positioning member 462. The connector 461 has a head portion 461a and a screw rod 461b. The head portion 461a is located in the top cap 44. The screw rod 461b passes through the opening 442 and the positioning member 462 and is adapted to be connected to the article having a screw hole.

Before the support 40 is assembled to the rotary plate 30, a pin 50 is put into the sectorial recess 32 of the rotary plate 30. A distal end of the pin 50 passes through the hole 242 of the protruding column 24, so that the pin 50 is movable along a central line L that passes through a center of the ball 26a; that is to say, the central line L is overlapped with an axis of the hole 242. Another end of the pin 50 has a head portion 52, and the head portion 52 is located in the curved groove 33 and abuts against the arched surface 35. The support 40 is connected to the sucking unit 20 by inserting each of two screws 48 through one of the two perforations 422b of the inner plate 422 of the tube body 42 and screwing into corresponding one of the two screw holes 243 of the protruding column 24. The rotary plate 30 is restricted between the seat 10 and the bottom portion of the support 40. At the same time, the annular projection 421a on the bottom portion of the support 40 is engaged with the annular groove 34 of the top surface of the rotary plate 30, so that the rotary plate 30 could be rotated stably. The annular projection 421a abuts against a body portion of the pin 50. As illustrated in FIG. 5 and FIG. 6, when the support 40 is assembled to the rotary plate 30, an end of the spring 26b urges against the inner plate 422. Besides, the first section 241a of the gas channel 241 of the protruding column 24 communicates with an interior of the tube body 42 via the vent 422a of the inner plate 422, and the second section 241b of the gas channel 241 directly communicates with a concave space S2 under the suction cup 22.

The configuration of the supporting structure 100 of the preferred embodiment according to the present invention is described above. A method of using thereof and the function thereof are described below.

As illustrated in FIG. 5 to FIG. 8, the suction cup 22 of the supporting structure 100 abuts against a smooth surface of an object (not shown), but the suction cup 22 does not be sucked or adhered to the smooth surface yet. At this time, the pushing blocks 37 on the bottom surface of the rotary plate 30 abut against the lower blocks 16a, and the head portion 52 of the pin 50 abuts against the first end 35a of the arched surface 35. When the pushing blocks 37 abut against the lower blocks 16a, a distance between the bottom surface of the extending plate 421 at the bottom portion of the support 40 and the bottom edge of the seat 10 is defined as a first distance D1, and a position of the rotary plate 30 is defined as a first position. Since the distance between the first end 35a of the arched surface 35 and a center of the protruding column 24 is smaller than a distance between the second end 35b of the arched surface 35 and the protruding column 24, when the head portion 52 of the pin 50 abuts against the first end 35a of the arched surface 35, the distal end of the pin 50 pushes the ball 26a to shift, thereby unblocking the gas channel 241. As shown in FIG. 6, a top portion of the suction cup 22 is spaced from the bottom side of the bulged portion 12 of the seat 10.

Figure 10:
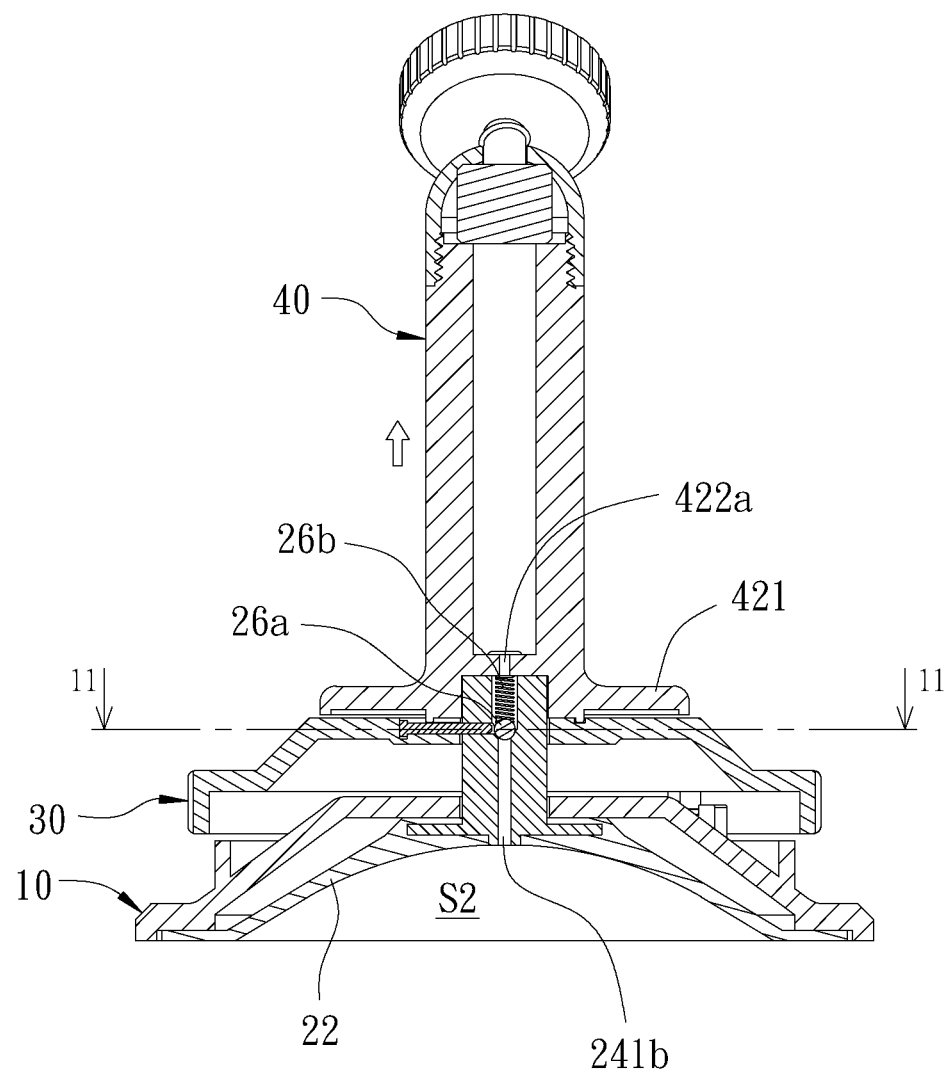
FIG. 10 is similar to FIG. 6, showing the suction cup of the supporting structure is deformed.
Figure 11:
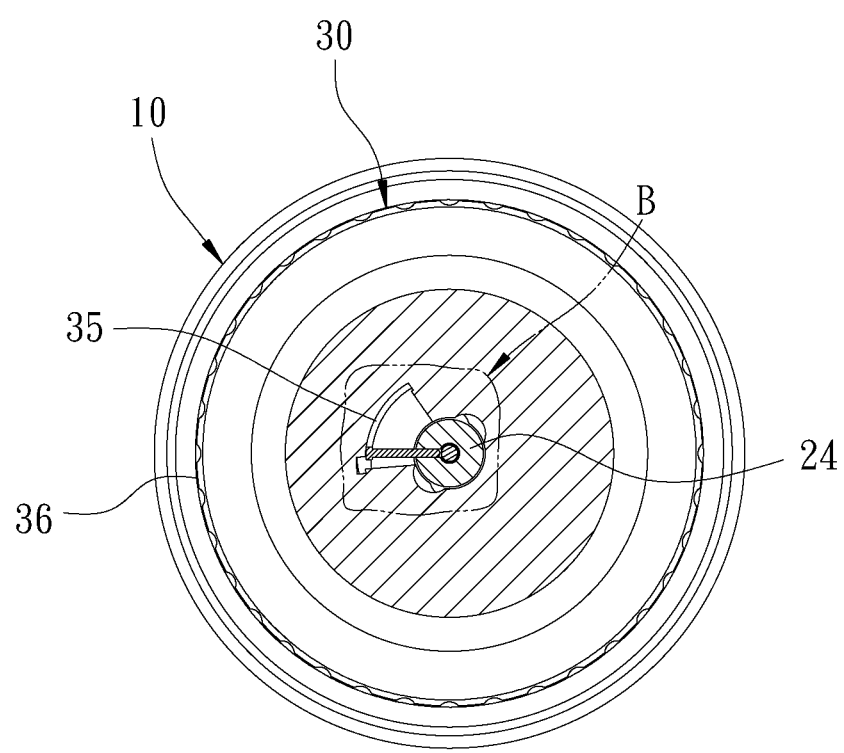
FIG. 11 is a section view taken along 11-11 line in FIG. 10.
Figure 12:
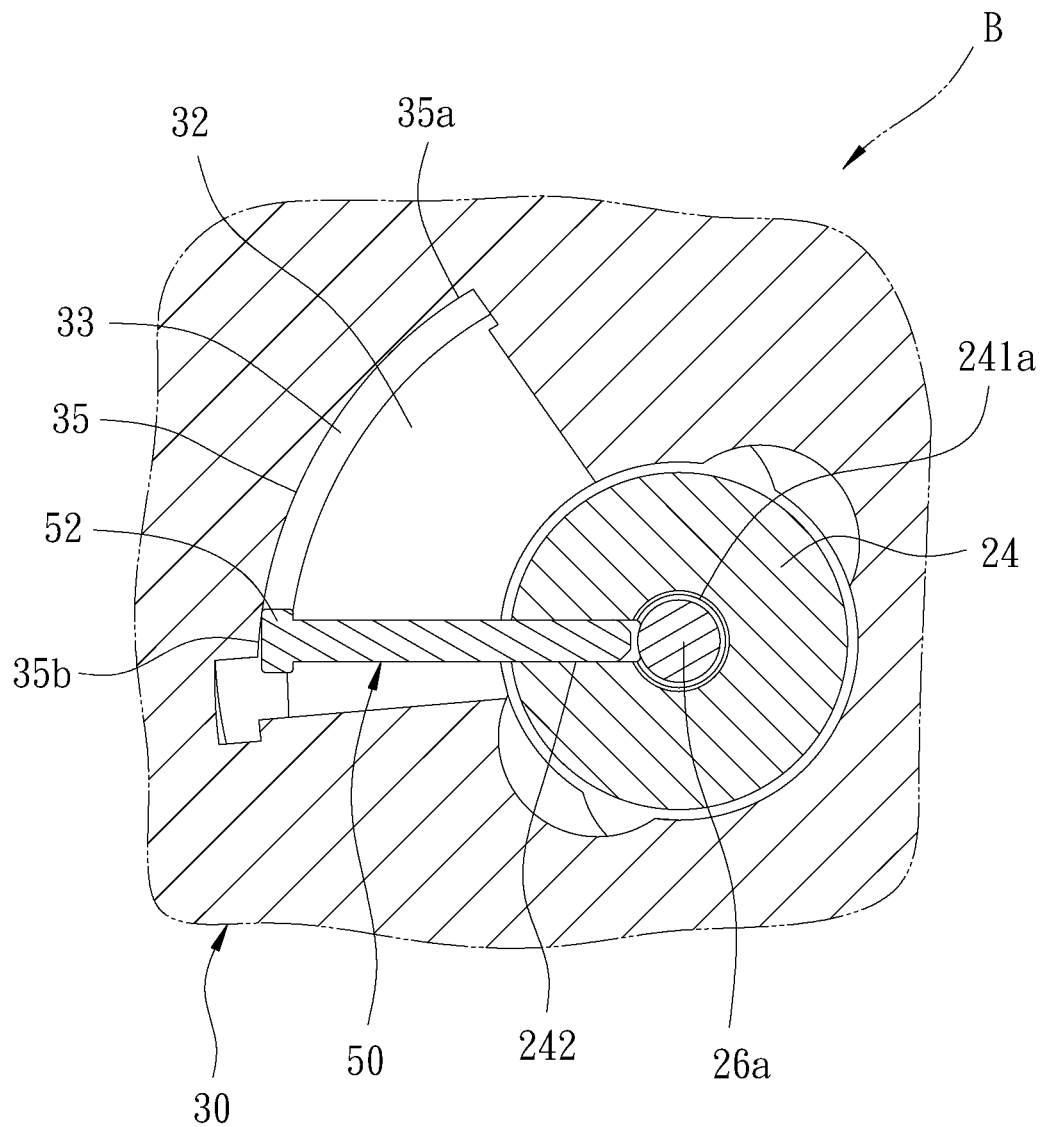
FIG. 12 is an enlarged partial view of a marked region B in FIG. 11.

As illustrated in FIG. 9 to FIG. 12, when the supporting structure 100 needs to adhere to the smooth surface, an outer periphery of the suction cup 22 is pressed by the seat 10 to attach to the smooth surface, and then the rotary plate 30 needs to be rotated by an user (as illustrated in FIG. 11, the rotary plate 30 is rotated clockwise). When the pushing blocks 37 are moved along the slanted surface 16 from the low level to the high level, the rotary plate 30 is simultaneously moved upward to drive the support 40 along with the sucking unit 20 to move upward, so that the distance between the bottom surface of the extending plate 421 at the bottom portion of the support 40 and the bottom edge of the seat 10 is gradually increased until the pushing blocks 37 abut against the upper blocks 16b. At this time, a position of the rotary plate 30 is defined as a second position, and a distance between the bottom surface of the extending plate 421 at the bottom portion of the support 40 and the bottom edge of the seat 10 is defined as a second distance D2, as shown in FIG. 10. The first distance D1 is smaller than the second distance D2.

During a process that the pushing block 37 is moved along the slanted surface 16 from the low level to the high level, the head portion 52 of the pin 50 is guided by the curved groove 33 to allow the pin 50 to be moved gradually in the radial direction away from the gas channel 241, so that the ball 26a urged by the spring 26b could gradually block the gas channel 241. Since the outer periphery of the suction cup 22 is pressed to be airtight, and the top portion of the suction cup 22 is pulled upward by the protruding column 24 to deform, the gas in the concave space S2 of the suction cup 22 is discharged through the gas channel 241 and the vent 422a before the gas channel 241 is completely blocked by the ball 26a, thereby creating a strong suction force. When the rotary plate 30 is located at the second position, the head portion 52 of the pin 50 abuts against the second end 35b of the arched surface 35. At this time, the ball 26 does not be restricted by the pin 50, so that the ball 26a urged by the spring 26b to move downward and tightly abut against the shoulder 241c, thereby completely blocking the gas channel 241. Thus, it is assured that the supporting structure 100 is firmly attached to the smooth surface.

The slanted surfaces 16 and the pushing blocks 37 are configured to allow the distance between the bottom portion of the support 40 and the seat 10 to be gradually increased when the user rotates the rotary plate 30 clockwise, thereby providing a lifting means of the present invention. Additionally, when the suction cup 22 that firmly sucks to the smooth surface needs to be removed, the user rotates the rotary plate 30 counter-clockwise from the second position to the first position. When the rotary plate 30 is moved from the second position to the first position, the distance between the bottom surface of the extending plate 421 and the bottom edge of the seat 10 is gradually reduced, and the pin 50 is pushed by the arched surface 35 to move toward the center of the protruding column 24 to shift the ball 26a, thereby unblocking the gas channel 241 to discharge the pressure. Thus, the pin 50, the hole 242 extending in the radial direction of the protruding column 24, the sectorial recess 32, the arched surface 35 having a curvature that is different from the curvature of the circumference 36 of the rotary plate 30 are configured to provide a part of a discharging means of the present invention.

It must be pointed out that the embodiment described above is only a preferred embodiment of the present invention. All equivalent structures which employ the concepts disclosed in this specification and the appended claims should fall within the scope of the present invention.

What is claimed is:

1. A supporting structure, comprising:
a seat having a bulged portion, a cavity, and a perforation, wherein the cavity of the seat is formed corresponding to the bulged portion, and the perforation communicates with the cavity;
a sucking unit comprising a suction cup, a protruding column, and a check valve, wherein the suction cup is located in the cavity of the seat; the protruding column has a gas channel and a first end and a second end that are opposite; the first end of the protruding column is connected to a central portion of the suction cup, and the second end passes through the perforation of the seat; the check valve is disposed in the gas channel of the protruding column;
a support having a top portion and a bottom portion, wherein the top portion of the support is adapted to be connected to an article; the bottom portion of the support is connected to the second end of the protruding column; and
a rotary plate passed through by the protruding column and located between the seat and the bottom portion, wherein the rotary plate is rotatable along the protruding column between a first position and a second position; when the rotary plate is located at the first position, the check valve is open to unblock the gas channel; when the rotary plate is located at the second position, the check valve is closed to block the gas channel.

2. The supporting structure as claimed in claim 1, wherein when the rotary plate is located at the first position, a distance between the bottom portion of the support and the seat is defined as a first distance; when the rotary plate is located at the second position, the distance between the bottom portion of the support and the seat is defined as a second distance; the first distance is smaller than the second distance.

3. The supporting structure as claimed in claim 2, wherein the support comprises a tube body, and the gas channel of the protruding column comprises a first section and a second section; a diameter of the first section is greater than a diameter of the second section; the first section communicates with an interior of the tube body; the second section communicates with a concave space under the suction cup; a connection site between the first section and the second section forms a shoulder; the check valve comprises a ball and a spring; the ball is located in the first section, and the spring urges the ball to abut against the shoulder.

4. The supporting structure as claimed in claim 2, comprising a lifting means, wherein the lifting means is adapted to increase the distance between the bottom portion of the support and the seat when the rotary plate is rotated from the first position to the second position.

5. The supporting structure as claimed in claim 4, wherein the lifting means comprises at least one slanted surface and at least one pushing block; the at least one slanted surface is formed by protruding from the bulged portion of the seat, and the at least one pushing block that is formed on a bottom surface of the rotary plate; the at least one slanted surface has a low level and a high level; the at least one pushing block is movable along the at least one slanted surface between the low level and the high level as the rotary plate is rotated.

6. The supporting structure as claimed in claim 5, wherein the at least one slanted surface of the seat is disposed with a lower block at the low level and an upper block at the high level; when the at least one pushing block abuts against the lower block, a position of the rotary plate is defined as the first position; when the at least one pushing block abuts against the upper block, a position of the rotary plate is defined as the second position.

7. The supporting structure as claimed in claim 3, comprising a discharging means, wherein the discharging means is adapted to keep the gas channel open when the rotary plate is rotated from the second position to the first position to reduce the distance between the bottom portion of the support and the seat.

8. The supporting structure as claimed in claim 7, wherein the discharging means comprises a pin, a hole disposed on the protruding column, a sectorial recess; the hole extends in a radial direction of the protruding column and communicates with the gas channel; a sectorial recess is formed by recessing into a top surface of the rotary plate and has an arched surface; the pin is disposed in the sectorial recess and movably passes through the hole extending in the radial direction; an end of the pin corresponding to the ball, and another end of the pin abuts against the arched surface; the arched surface has a curvature that is different from a curvature of a circumference of the rotary plate.

9. The supporting structure as claimed in claim 8, wherein the top surface of the rotary plate has an annular groove and a curved groove; the annular groove surrounds the protruding column, and a radius of the annular groove is constant; the curved groove is disposed along the arched surface; the bottom portion of the support has an annular projection that is correspondingly engaged with the annular groove; the pin has a head portion, and the head portion is located in the curved groove.

10. The supporting structure as claimed in claim 8, wherein a diameter of the first section of the gas channel is greater than a diameter of the ball; the pin is moved along a central line, wherein the central line passes through a center of the ball when the ball is blocked the gas channel.

* * * * *